(12) United States Patent
Connors, Sr. et al.

(10) Patent No.: US 8,505,335 B2
(45) Date of Patent: Aug. 13, 2013

(54) REFRACTOY COMPOSITION FOR GLASS MELTING FURNACES

(75) Inventors: Charles W. Connors, Sr., Wilmette, IL (US); Michael W. Anderson, West Chicago, IL (US); Shirish Shah, Carol Stream, IL (US)

(73) Assignee: Magneco/Metrel, Inc., Addison, IL (US)

( * ) Notice: Subject to any disclaimer, the term of this patent is extended or adjusted under 35 U.S.C. 154(b) by 880 days.

(21) Appl. No.: 11/820,389

(22) Filed: Jun. 19, 2007

(65) Prior Publication Data
US 2008/0314084 A1    Dec. 25, 2008

(51) Int. Cl.
*C03B 5/43* (2006.01)

(52) U.S. Cl.
USPC ............................................................ 65/27

(58) Field of Classification Search
USPC ............................................ 65/27; 501/105
See application file for complete search history.

(56) References Cited

U.S. PATENT DOCUMENTS

| | | | |
|---|---|---|---|
| 3,752,682 A * | 8/1973 | Nameishi et al. | 501/107 |
| 3,885,005 A | 5/1975 | Downing et al. | |
| 4,119,472 A | 10/1978 | Brashear, Jr. et al. | |
| 4,212,680 A | 7/1980 | Schulz | |
| 5,155,070 A | 10/1992 | Skorupa | |
| 5,403,794 A | 4/1995 | Morris et al. | |
| 5,578,538 A * | 11/1996 | Nishikawa et al. | 501/124 |
| 5,900,382 A | 5/1999 | Shaw | |
| 6,158,248 A | 12/2000 | Beppu | |
| 7,074,733 B2 | 7/2006 | Guigonis et al. | |
| 7,176,153 B2 | 2/2007 | Anderson | |
| 2004/0138048 A1* | 7/2004 | Anderson | 501/107 |
| 2004/0266604 A1 | 12/2004 | Guigonis et al. | |

FOREIGN PATENT DOCUMENTS

| | | |
|---|---|---|
| CH | 509950 | 7/1971 |
| DE | 2738974 | 3/1978 |
| DE | 198 45 761 A1 | 4/2000 |
| EP | 0 193 751 A2 | 9/1986 |
| EP | 0 298 860 A1 | 1/1989 |
| EP | 0939065 A1 | 9/1999 |
| EP | 1428807 A2 | 6/2004 |
| EP | 1428807 A3 | 12/2004 |
| EP | 1810956 A1 | 7/2007 |
| FR | 2241512 | 3/1975 |
| GB | 967934 | 8/1964 |
| GB | 993161 | 5/1965 |
| GB | 1184729 | 8/1967 |
| GB | 1184729 | 3/1970 |
| GB | 1194158 | 6/1970 |
| GB | 1283692 | 8/1972 |

* cited by examiner

*Primary Examiner* — Joseph S Del Sole
*Assistant Examiner* — Erin Snelting
(74) *Attorney, Agent, or Firm* — Brinks Hofer Gilson & Lione

(57) ABSTRACT

A refractory system includes a first set of components and a colloidal silica binder. The first set of components includes alumina and zirconia. The colloidal silica binder is at 5 wt % to 20 wt % of the dry weight of the first set of components. The refractory composition comprises 10 wt % to 45 wt % alumina, at least 35 wt % zirconia, and at least 20 wt % silica.

10 Claims, 1 Drawing Sheet

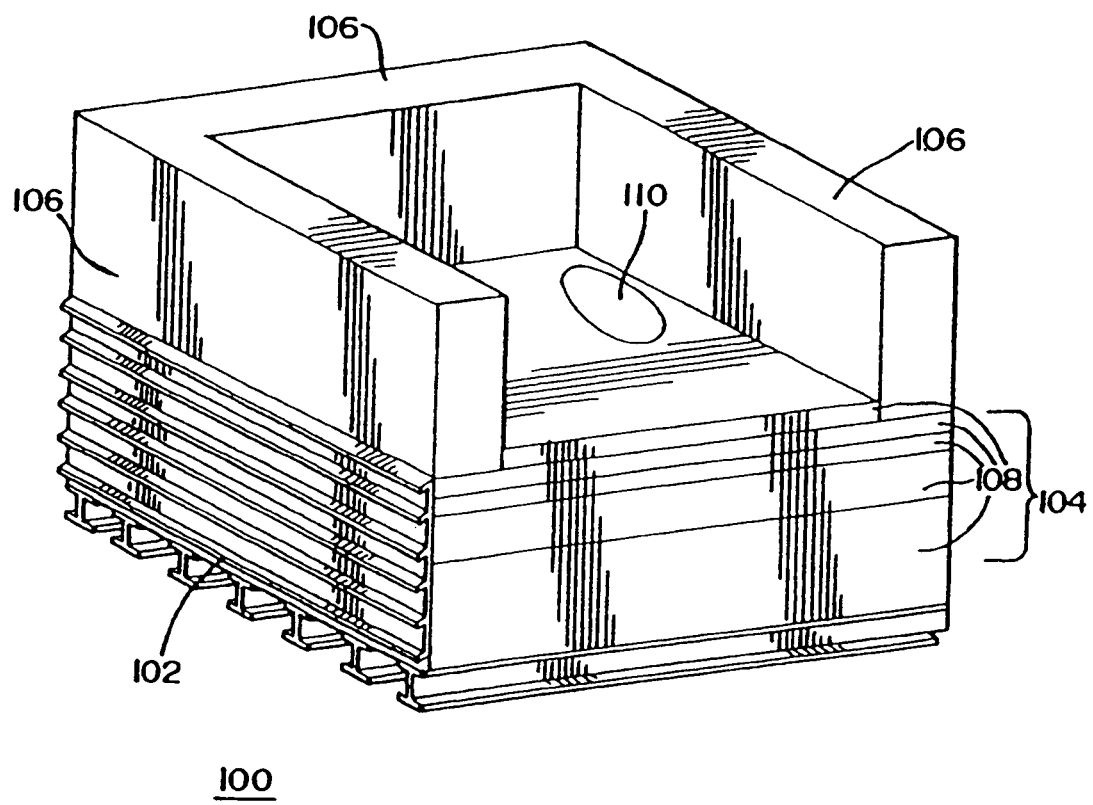

REFRACTOY COMPOSITION FOR GLASS MELTING FURNACES

FIELD OF THE INVENTION

This invention generally relates to refractory compositions especially useful for glass melting furnaces. More particularly, this invention relates to colloidal silica refractories for the lining of glass melting furnaces.

BACKGROUND

Glass melting furnaces are refractory lined vessels shaped as containers for melting and holding glass. In the melting operation, the incoming glass making materials are heated to about 2800° F. (1550° C.). The glass-making materials usually include a mixture of cullet and batch materials. Cullet is crushed glass from the manufacturing process. Batch materials include sand (silica), lime (limestone or calcium carbonate reduced to calcium monoxide), soda ash (sodium monoxide), and sometimes other materials such as feldspar, salt cake, and metal oxides. During the melting operation, the cullet melts first to increase the heat transfer to the batch materials and to reduce the melting time.

Glass melting furnaces include pot furnaces, glass tanks, tank furnaces, and the like. Pot furnaces have a crucible or bowl shape configuration and typically are used to melt smaller quantities of glass. Glass tanks range from smaller day tanks to larger continuous melt tanks. Day tanks are usually filled with glass making materials for overnight melting. Continuous melt tanks are large furnaces where glass making materials are charged at one end, melt, and flow to the other end for removal. Glass tanks typically are constructed of separate refractory brick or blocks within a steel frame. The blocks fit together without mortar and typically are arranged in a rectangular shape to hold molten glass. The mechanical pressure from the steel frame and outer blocks holds the blocks together. Glass tanks generally have regenerative chambers to preheat combustion air for higher flame temperatures.

The refractory blocks usually receive considerable wear from the molten glass and the charging of glass making materials. Molten glass is highly corrosive. The refractory blocks usually are made of composite clays having alumina, zirconia, and silica (AZS). The AZS refractory blocks are made from molten material cast into molds, which are machined after hardening.

The melting operation in continuous melt tanks continues essentially non-stop until the tank is no longer usable. During the melting operation, the refractory blocks can become deeply scored and may develop wear spots or portions where the molten glass has eroded or dissolved the refractory. The wear spots typically grow until the refractory fails to hold the molten glass. The wear spots shorten the service life of glass tanks and often are unpredictable, thus disrupting production of molten glass.

SUMMARY

In one aspect, this invention provides a refractory composition especially useful for glass melting furnaces. The refractory composition has been found to provide excellent corrosion resistance. The refractory composition includes a first set of components mixed with a silica binder. The first set of components includes alumina and zirconia. The colloidal silica binder is at 5 wt % to 20 wt % of the dry weight of the first set of components. The refractory composition comprises 10 wt % to 45 wt % alumina, at least 35 wt % zirconia, and at least 20 wt % silica.

In another aspect, a method of preparing a refractory for a glass melting furnace includes providing a first set of components comprising alumina and zirconia. A colloidal silica binder is provided at 5 wt % to 20 wt % of the dry weight of the first set of components and is mixed with the first set of components to form a refractory composition. The refractory composition includes 10 wt % to 45 wt % alumina, at least 35 wt % zirconia, and at least 20 wt % silica. The refractory composition is formed on the surface of the glass melting furnace.

The foregoing and other features and advantages of the present invention will become apparent from the following detailed description of the presently preferred embodiments, when read in conjunction with the accompanying examples.

BRIEF DESCRIPTION OF THE FIGURES

The invention may be better understood with reference to the following FIGURE and detailed description. The components in the FIGURE are not necessarily to scale, emphasis being placed upon illustrating the principles of the invention.

FIG. 1 represents a partial perspective view of a glass tank with a colloidal silica refractory system of one embodiment of the invention.

DETAILED DESCRIPTION OF THE PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention provides a colloidal silica refractory composition that is especially useful for glass melting furnaces. In particular, the refractory composition includes a relatively high amount of zirconia, which provided surprisingly good resistance to high temperature corrosive environments. The refractory composition disclosed herein may also be used on other applications, such as other types of furnaces.

FIG. 1 represents a partial perspective view of a glass melting furnace or tank 100 with a refractory system. The glass tank 100 may have additional features and components such as melting and refining chambers, regenerators, burners, and the like, which are not shown. The glass tank 100 has a frame 102 supporting a hearth 104 and sidewalls 106. The frame 102 is made of steel plates and beams and may comprise other materials suitable for a glass melting furnace. The sidewalls 106 extend vertically from the hearth 104 to form a container shape for melting and holding glass. The hearth 104 has one or more hearth linings 108 of refractory materials. The sidewalls 106 also have one or more sidewall linings of refractory materials. The linings may have the same or different refractory materials.

The refractory materials used in tank 100 are generally bricks, blocks, or a monolithic configuration. The blocks generally include alumina, zirconia, silica, a combination thereof, or another suitable refractory for glass melting furnaces. The colloidal silica refractory composition described herein is especially useful for lining the surface of the tank 100. In one embodiment, the glass tank 100 has a patch lining 110 formed over a wear portion of the hearth 104. The wear portion may be anywhere along the inside of the glass tank including the hearth and sidewalls and above or below the molten glass. There may be one or more patch linings on the hearth 104 and/or the sidewalls 106. The patch lining 100 may include a colloidal silica refractory as described herein.

In one embodiment, the refractory comprises a mixture of a silica binder with a first set of components. The silica binder is in the range of about 5 wt % through about 20 wt % of the dry weight of the first set of components, preferably between 6 wt % and 12 wt % of the dry weight of the first set of components. In one embodiment, the binder is a colloidal silica binder. The first set of components includes alumina ($Al_2O_3$), zirconia ($ZrO_2$), and silica ($SiO_2$). The first set of components may be dry or wet and also may include other minerals, a setting agent like magnesia (MgO), and/or a flow modifier.

The alumina, zirconia, and silica provide strength and corrosion resistance. The alumina may be provided by a high aluminum aggregate such as tabular or white fused alumina. The alumina also may be reactive or calcined. The zirconia may be provided by zircon flour or a zirconia bearing material. The silica may be provided by fumed silica, mullite (aluminum silicate), microsilica, colloidal silica, or the like.

The silica binder holds or binds the first set of components together in a monolithic form. In one embodiment, the binder is a colloidal silica binder. The colloidal silica binder comprises colloidal silica in water, where the silica is in the range of about 15 wt % through about 70 wt %. In one embodiment, the colloidal silica may have an average particle diameter in the range of about 4 millimicrons through about 100 millimicrons.

The first set of components may include about 10 wt % to about 35 wt % alumina, about 60 wt % to about 85 wt % zircon, and up to about 10 wt % silica. Preferably, the first set of components includes about 15 wt % to about 30 wt % alumina, more preferably about 20 wt % to about 25 wt % alumina. Preferably, the first set of components includes about 65 wt % to about 80 wt % zircon, more preferably about 70 wt % to about 80 wt % zircon. Preferably, the first set of components includes about 1 wt % to about 5 wt % silica, more preferably about 2 wt % silica.

The first set of components may include about 5 wt % to about 12 wt % alumina of mesh size ¼×8, about 5 wt % to about 12 wt % alumina of mesh size 8×14, and about 2 wt % to about 12 wt % alumina of mesh size −14M. In one embodiment, the first set of components includes up to about 5 wt % reactive alumina.

Other proportions of the first set of components may be used. The first set of components may include other compounds such as about 0.1 wt % magnesia. The amount of magnesia may be adjusted to increase or decrease the setting time for the colloidal system refractory. The first set of components also may include a flow modifier to enhance or alter the flow properties for forming the colloidal silica refractory prior to setting. The first set of components may be mixed prior to the addition of the colloidal silica binder.

The resulting refractory composition includes about 10 wt % to about 45 wt % alumina, at least about 35 wt % zirconia, and at least about 20 wt % silica. The refractory composition may include about 15 wt % to about 40 wt % alumina, about 15 wt % to about 30 wt % alumina, or about 20 wt % to about 25 wt % alumina. The refractory composition may include about 40 wt % to about 60 wt % zirconia, about 40 wt % to about 55 wt % zirconia, or at least about 40 wt %, 45 wt %, or 50 wt % zirconia. The refractory composition may include about 20 wt % to about 40 wt % silica, about 25 wt % to about 35 wt % silica, or at least about 20 wt %, 25 wt %, or 30 wt % silica.

The refractory composition may be cast into blocks for subsequent use in a glass tank or may be formed directly onto the wear portion of a glass tank, such as patch lining 100 shown in FIG. 1. The refractory composition may be formed on the wear portion using one or more refractory forming methods such as casting, pumping, or shotcreting (formless pumping with a setting accelerant). The refractory composition may be formed on one or more portions of the sidewall or hearth. The refractory composition may be formed directly on the wear portion without the replacement of refractory blocks in a glass melting furnace.

EXAMPLES

For illustration purposes and not as a limitation, Table 1 provides exemplary types and proportions of first set of components for the colloidal silica refractory system.

TABLE 1

| Raw Material | Mesh Size | Comparative Example Wt % | Example 1 Wt % | Example 2 Wt % |
|---|---|---|---|---|
| Tabular Alumina | ¼ × 8 | 0 | 8.7 | 8.7 |
| Tabular Alumina | 8 × 14 | 37.7 | 8.7 | 8.7 |
| Tabular Alumina | −14 M | 4.7 | 8.7 | 4.4 |
| Reactive Alumina (e.g., CAR 120B) | −325 M | 4.7 | 0 | 4.4 |
| Calcined Alumina (e.g., CAR 60RG) | −325 M | 9.4 | 0 | 0 |
| Zircon Flour | −325 M | 16.5 | 41.3 | 41.3 |
| Zircon Sand | | 0 | 30.5 | 30.5 |
| Fumed silica | | 2.4 | 2.2 | 2.2 |
| White fused mullite | | 23.5 | 0 | 0 |
| Al powder | | 0.9 | 0 | 0.9 |
| Surfactant | | 0.05 | 0.04 | 0.04 |
| MgO 98% | −200 M | 0.09 | 0.09 | 0.09 |

The components are commercially available from Alcan and other suppliers. For each Example, the first set of components was mixed together prior to mixing with the colloidal silica binder. The colloidal silica binder was provided at a wt % of about 7% to about 10% by weight of the dry components. The mixture cured into a colloidal silica refractory. The Comparative Example yielded a refractory containing about 75 wt % alumina, about 11 wt % zirconia, and about 14 wt % silica. The formulas of Examples 1 and 2 yielded refractories containing about 25 wt % alumina, about 47 wt % zirconia, and about 28 wt % silica. Thus, the refractories of Examples 1 and 2 had significantly higher amount of zirconia than the refractory of the Comparative Example.

To simulate the harsh conditions in a glass melting furnace, refractory corrosion tests were performed on the colloidal silica refractories to evaluate their resistance to sodium hexametaphosphate. Thin columns or pencils of the refractory compositions were prepared. The fingers were dipped into sodium hexametaphosphate at a high temperature. The tests were run for 36 hours at 1093° C. (2000° F.). After the test, the samples were analyzed to determine the resistance of the refractory composition to the harsh conditions. The pencil prepared from the formula of the Comparative Example was completely corroded. The pencils prepared from the compositions of Examples 1 and 2 were surprisingly resistant to corrosion and did not show any significant corrosion attack. The pencil of Example 1 did show some minor expansion and cracking. Thus, the high zirconia colloidal silica refractories disclosed herein show superior resistance under harsh conditions compared to a low-zirconia refractory.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

The invention claimed is:

1. A method of preparing a refractory for a glass melting furnace, comprising:
providing a first set of components comprising alumina and zirconia, wherein the first set of components comprises 10 wt % to 35 wt % alumina, 60 wt % to 85 wt % zircon, and up to 10 wt % silica, and
wherein the zirconia comprises
a first portion having a larger particle size, the first portion comprising zircon sand and
a second portion having a smaller particle size, the second portion comprising zircon flour, and
providing a colloidal silica binder at 5 wt % to 20 wt % of the dry weight of the first set of components,
mixing the first set of components with the colloidal silica binder to form a refractory composition comprising about 15 wt % to 30 wt % alumina, 40 wt % to 55 wt % zirconia, and 25 wt % to 35 wt % silica; and
forming a monolithic refractory composition on a surface of the furnace.

2. The method of claim 1 wherein the silica binder is at 6 wt % to 12 wt % of the dry weight of the first set of components.

3. The method of claims 1 wherein the refractory composition is formed by a method selected from casting, pumping, and shotcreting.

4. The method of claim 1 wherein the refractory composition comprises about 25 wt % alumina, about 47 wt % zirconia, and about 28 wt % silica.

5. The method of claim 1 wherein the first set of components comprises about 26.1 wt % alumina, about 71.8 wt % zircon, and about 2.2 wt % silica.

6. The method of claim 1, wherein the first set of components comprises about 70 wt % to about 80 wt % zircon.

7. The method of claim 1, wherein the first set of components comprises about 5 wt % to about 12 wt % alumina of mesh size ¼×8.

8. The method of claim 1, wherein the first set of components comprises 41.3 wt % zircon flour, and 30.5 wt % zircon sand.

9. The method of claim 1, wherein the first set of components comprises about 20 wt % to about 25 wt % alumina.

10. The method of claim 1, wherein the refractory composition comprises about 20 wt % to about 25 wt % alumina.

* * * * *